US011546634B2

(12) United States Patent
Meardi

(10) Patent No.: US 11,546,634 B2
(45) Date of Patent: Jan. 3, 2023

(54) UPSAMPLING FOR SIGNAL ENHANCEMENT CODING

(71) Applicant: V-NOVA INTERNATIONAL LIMITED, London (GB)

(72) Inventor: Guido Meardi, London (GB)

(73) Assignee: V-NOVA INTERNATIONAL LIMITED

( * ) Notice: Subject to any disclaimer, the term of this patent is extended or adjusted under 35 U.S.C. 154(b) by 0 days.

(21) Appl. No.: 17/265,145

(22) PCT Filed: Aug. 1, 2019

(86) PCT No.: PCT/GB2019/052152
§ 371 (c)(1),
(2) Date: Feb. 1, 2021

(87) PCT Pub. No.: WO2020/025955
PCT Pub. Date: Feb. 6, 2020

(65) Prior Publication Data
US 2021/0329244 A1    Oct. 21, 2021

(30) Foreign Application Priority Data

Aug. 3, 2018  (GB) ...................................... 1812708
Aug. 3, 2018  (GB) ...................................... 1812709
(Continued)

(51) Int. Cl.
*H04N 19/00*  (2014.01)
*H04N 19/61*  (2014.01)
(Continued)

(52) U.S. Cl.
CPC ........... *H04N 19/61* (2014.11); *H04N 19/105* (2014.11); *H04N 19/122* (2014.11);
(Continued)

(58) Field of Classification Search
CPC .... H04N 19/122; H04N 19/136; H04N 19/44; H04N 19/33; H04N 19/36
See application file for complete search history.

(56) References Cited

U.S. PATENT DOCUMENTS 6,014,694 A * 1/2000 Aharoni ........... H04N 21/23439
709/219
2002/0101536 A1* 8/2002 Cook ................... H04N 19/186
348/453
(Continued)

FOREIGN PATENT DOCUMENTS

EP       2816805        12/2014
WO    2007-011189        1/2007
(Continued)

OTHER PUBLICATIONS https://web.archive.org/web/20170703003140/https://clouard.users.greyc.fr/Pantheon/experiments/rescaling/index-en.html, 2017.*
(Continued)

*Primary Examiner* — Frank F Huang
(74) *Attorney, Agent, or Firm* — Workman Nydegger

(57) ABSTRACT

There is disclosed a method of encoding an input signal, the method comprising: receiving a base encoded signal, the base encoded signal being generated by feeding an encoder with a down-sampled version of an input signal; producing a first residual signal by: decoding the base encoded signal to produce a first decoded signal; and using a difference between the base decoded signal and the down-sampled version of the input signal to produce the first residual signal; producing a second residual signal by: correcting the base decoded signal using the residual signal to create a corrected decoded version; up-sampling the corrected decoded version; and using a difference between the up-sampled corrected decoded signal and the input signal to produce the second residual signal; wherein the up-sampling
(Continued)

is one of bilinear or bicubic up-sampling. A corresponding decoding method is also disclosed.

18 Claims, 13 Drawing Sheets

(30) Foreign Application Priority Data

| Aug. 3, 2018 | (GB) | 1812710 |
|---|---|---|
| Mar. 20, 2019 | (GB) | 1903844 |
| Mar. 23, 2019 | (GB) | 1904014 |
| Mar. 29, 2019 | (GB) | 1904492 |
| Apr. 15, 2019 | (GB) | 1905325 |

(51) Int. Cl.

| H04N 19/124 | (2014.01) |
|---|---|
| H04N 19/91 | (2014.01) |
| H04N 19/105 | (2014.01) |
| H04N 19/46 | (2014.01) |
| H04N 19/70 | (2014.01) |
| H04N 19/93 | (2014.01) |
| H04N 19/122 | (2014.01) |
| H04N 19/136 | (2014.01) |
| H04N 19/33 | (2014.01) |
| H04N 19/36 | (2014.01) |
| H04N 19/44 | (2014.01) |
| H04N 19/60 | (2014.01) |

(52) U.S. Cl.
CPC ......... *H04N 19/124* (2014.11); *H04N 19/136* (2014.11); *H04N 19/33* (2014.11); *H04N 19/36* (2014.11); *H04N 19/44* (2014.11); *H04N 19/46* (2014.11); *H04N 19/60* (2014.11); *H04N 19/70* (2014.11); *H04N 19/91* (2014.11); *H04N 19/93* (2014.11)

(56) References Cited

U.S. PATENT DOCUMENTS

| 2010/0046612 | A1* | 2/2010 | Sun | H04N 19/187 375/240.02 |
|---|---|---|---|---|
| 2010/0295851 | A1* | 11/2010 | Diamand | G06T 15/60 345/422 |
| 2013/0294495 | A1* | 11/2013 | Rossato | H04N 19/463 375/240.01 |
| 2015/0341636 | A1* | 11/2015 | Tsai | H04N 19/593 375/240.02 |
| 2015/0381999 | A1* | 12/2015 | Chuang | H04N 19/513 375/240.16 |
| 2018/0068463 | A1* | 3/2018 | Risser | G06T 7/45 |
| 2020/0366938 | A1* | 11/2020 | Makeev | H04N 19/33 |

FOREIGN PATENT DOCUMENTS

| WO | 2013-171173 | 11/2013 |
|---|---|---|
| WO | 2014-025741 | 2/2014 |

OTHER PUBLICATIONS

Han, "Comparison of Commonly Used Image Interpolation Methods", Proceedings of the $2^{nd}$ International Conference on Computer Science and Electronics Engineering (ICCSEE 2013), Mar. 23, 2013, XP55576828, DOI: 10.2991/iccsee.2013.391, ISBN: 978-90-78-67761-1.

International Search Report and Written Opinion for PCT/GB2019/052152 dated Dec. 10, 2019.

Schwarz et al., "Overview of the Scalable Video Coding Extension of the H.264/AVC Standard", IEEE Transaction on Circuits and Systems for Video Technology, vol. 17, No. 9, Sep. 1, 2007, pp. 1103-1120, XP055378169, US ISSN: 1051-8215, DOI: 10.1109/TCSVT.2007.905532, retrieved from the internet on Feb. 1, 2021: URL: https://www.researchgate.net/publication/3309174_Overview_of_the_Scalable_Video_Coding_Extension_of_the_H264AVC_Standard.

"Working Draft of Low Complexity Enhancement Video Coding", 126. MPEG Meeting, Mar. 25, 2019 to Mar. 29, 2019, Geneva (Motion Picture Expert Group or ISO/IEC JTC1/SC29/WG11), No. n18454, Apr. 18, 2019, XP030208724, retrieved from the internet on Feb. 1, 2021: URL: https://mpeg.chiariglione.org/meetings/126.

* cited by examiner

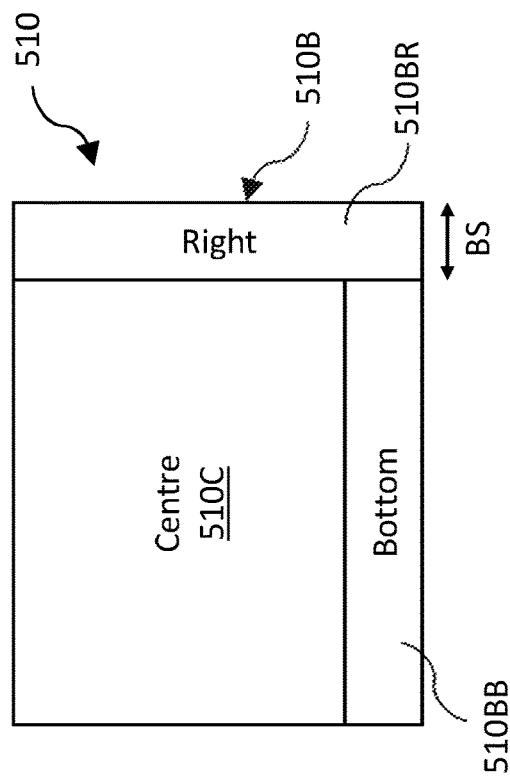
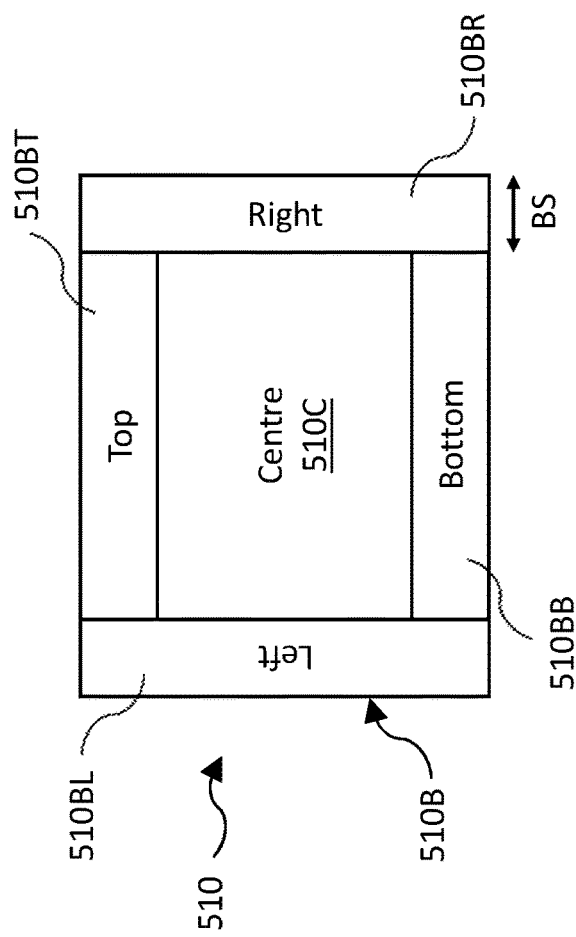
FIG. 5B
FIG. 5A

UPSAMPLING FOR SIGNAL ENHANCEMENT CODING

The present application is a 371 US Nationalization of International Patent Application No. PCT/GB2019/052152, filed Aug. 1, 2019, which claims priority to UK Patent Application No(s):

1812708.4, filed Aug. 3, 2018;
1812709.2, filed Aug. 3, 2018;
1812710.0, filed Aug. 3, 2018;
1903844.7, filed Mar. 20, 2019;
1904014.6, filed Mar. 23, 2019; and
1904492.4, filed Mar. 29, 2019.

The disclosures of which are enclosed herein in their entireties.

TECHNICAL FIELD

This disclosure relates to a method and apparatus for encoding and/or decoding a signal. In particular, but not exclusively, this disclosure relates to a method and apparatus for encoding and/or decoding video and/or image signals, but it can be extended to any other type of data to be compressed and decompressed.

BACKGROUND

There is an urgent need to create flexible solutions to signal encoding and decoding schemes, particularly in the field of video encoding and decoding. Also, it is important to provide the highest quality video output to viewers wherever possible, and to do so in a way that is backward compatible with existing technologies and decoder hardware.

It is an aim of this disclosure to provide a solution to one or more of these needs.

SUMMARY

There are provided methods, computer programs, computer-readable mediums, an encoder and a decoder as set out in the appended claims.

BRIEF DESCRIPTION OF THE DRAWINGS

Embodiments of the invention will now be described with reference to the accompanying drawings, in which:

FIGS. 5A and 5B show how a frame to be up-sampled is divided into center and border regions.

DETAILED DESCRIPTION OF THE EMBODIMENT(S)

This disclosure describes a hybrid backward-compatible coding technology. This technology is a flexible, adaptable, highly efficient and computationally inexpensive coding format which combines a different video coding format, a base codec (i.e. encoder-decoder), (e.g. AVC/H.264, HEVC/H.265, or any other present or future codec, as well as non-standard algorithms such as VP9, AV1 and others) with at least two enhancement levels of coded data.

The general structure of the encoding scheme uses a down-sampled source signal encoded with a base codec, adds a first level of correction or enhancement data to the decoded output of the base codec to generate a corrected picture, and then adds a further level of correction or enhancement data to an up-sampled version of the corrected picture.

Thus, the streams are considered to be a base stream and one or more enhancement streams, where there are typically two enhancement streams. It is worth noting that typically the base stream may be decodable by a hardware decoder while the enhancement stream(s) may be suitable for software processing implementation with suitable power consumption.

This structure creates a plurality of degrees of freedom that allow great flexibility and adaptability in many situations, thus making the coding format suitable for many use cases including OTT transmission, live streaming, live UHD broadcast, and so on. It also provides for low complexity video coding.

Although the decoded output of the base codec is not intended for viewing, it is a fully decoded video at a lower resolution, making the output compatible with existing decoders and, where considered suitable, also usable as a lower resolution output.

The codec format uses a minimum number of relatively simple coding tools. When combined synergistically, they can provide visual quality improvements when compared with a full resolution picture encoded with the base codec whilst at the same time generating flexibility in the way they can be used.

The methods and apparatuses are based on an overall algorithm which is built over an existing encoding and/or decoding algorithm (e.g. MPEG standards such as AVC/H.264, HEVC/H.265, etc. as well as non-standard algorithms such as VP9, AV1, and others) which works as a baseline for an enhancement layer. The enhancement layer works accordingly to a different encoding and/or decoding algorithm. The idea behind the overall algorithm is to encode/decode hierarchically the video frame as opposed to using block-based approaches as done in the MPEG family of algorithms. Hierarchically encoding a frame includes generating residuals for the full frame, and then a reduced or decimated frame and so on.

Figure 1:
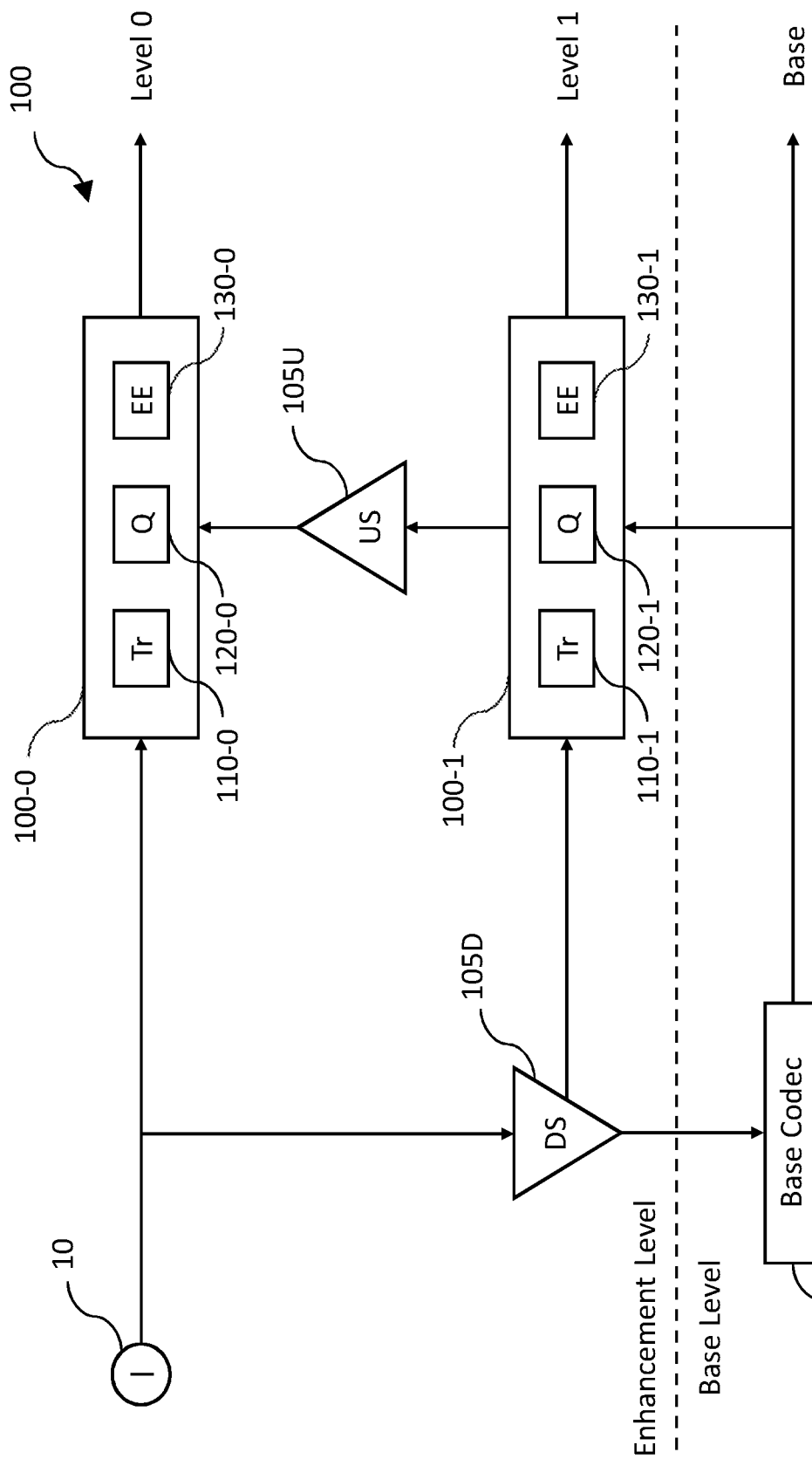
FIG. 1 is a block diagram illustrating an encoding process.

An encoding process is depicted in the block diagram of FIG. 1. The encoding process is split into two halves as shown by the dashed line. Below the dashed line is the base level of an encoder 100, which may usefully be implemented in hardware. Above the dashed line is the enhancement level, which may usefully be implemented in software. The encoder 100 may comprise only the enhancement level processes, or a combination of the base level processes and enhancement level processes as needed. The encoder 100 may usefully be implemented in software, especially at the enhancement level. This arrangement allows, for example, a legacy hardware encoder that provides the base level to be upgraded using a firmware (e.g. software) update, where the firmware is configured to provide the enhancement level. In newer devices, both the base level and the enhancement level may be provided in hardware and/or a combination of hardware and software.

The encoder topology at a general level is as follows. The encoder 100 comprises an input I for receiving an input signal 10. The input I is connected to a down-sampler 105D and processing block 100-0. The down-sampler 105D outputs to a base codec 120 at the base level of the encoder 100. The down-sample 105D also outputs to processing block 100-1. Processing block 100-1 passes an output to an up-sampler 105U, which in turn outputs to the processing block 100-0. Each of the processing blocks 100-0 and 100-1 comprise one or more of the following modules: a transform block 110, a quantisation block 120 and an entropy encoding block 130.

The input signal 10, such as in this example a full (or highest) resolution video, is processed by the encoder 100 to generate various encoded streams. A first encoded stream (an encoded base stream) is produced by feeding the base codec 120 (e.g., AVC, HEVC, or any other codec) at the base level with a down-sampled version of the input video 10, using the down-sampler 105D. A second encoded stream (an encoded level 1 stream) is created by reconstructing the encoded base stream to create a base reconstruction, and then taking the difference between the base reconstruction and the down-sampled version of the input video 10. This difference signal is then processed at block 100-1 to create the encoded level 1 stream. Block 100-1 comprises a transform block 110-1, a quantisation block 120-1 and an entropy encoding block 130-1. A third encoded stream (an encoded level 0 stream) is created by up-sampling a corrected version of the base reconstruction, using the up-sampler 105U, and taking the difference between the corrected version of the base reconstruction and the input signal 10. This difference signal is then processed at block 100-0 to create the encoded level 0 stream. Block 100-0 comprises a transform block 110-0, a quantisation block 120-0 and an entropy encoding block 130-0.

The encoded base stream may be referred to as the base layer or base level.

Figure 2:
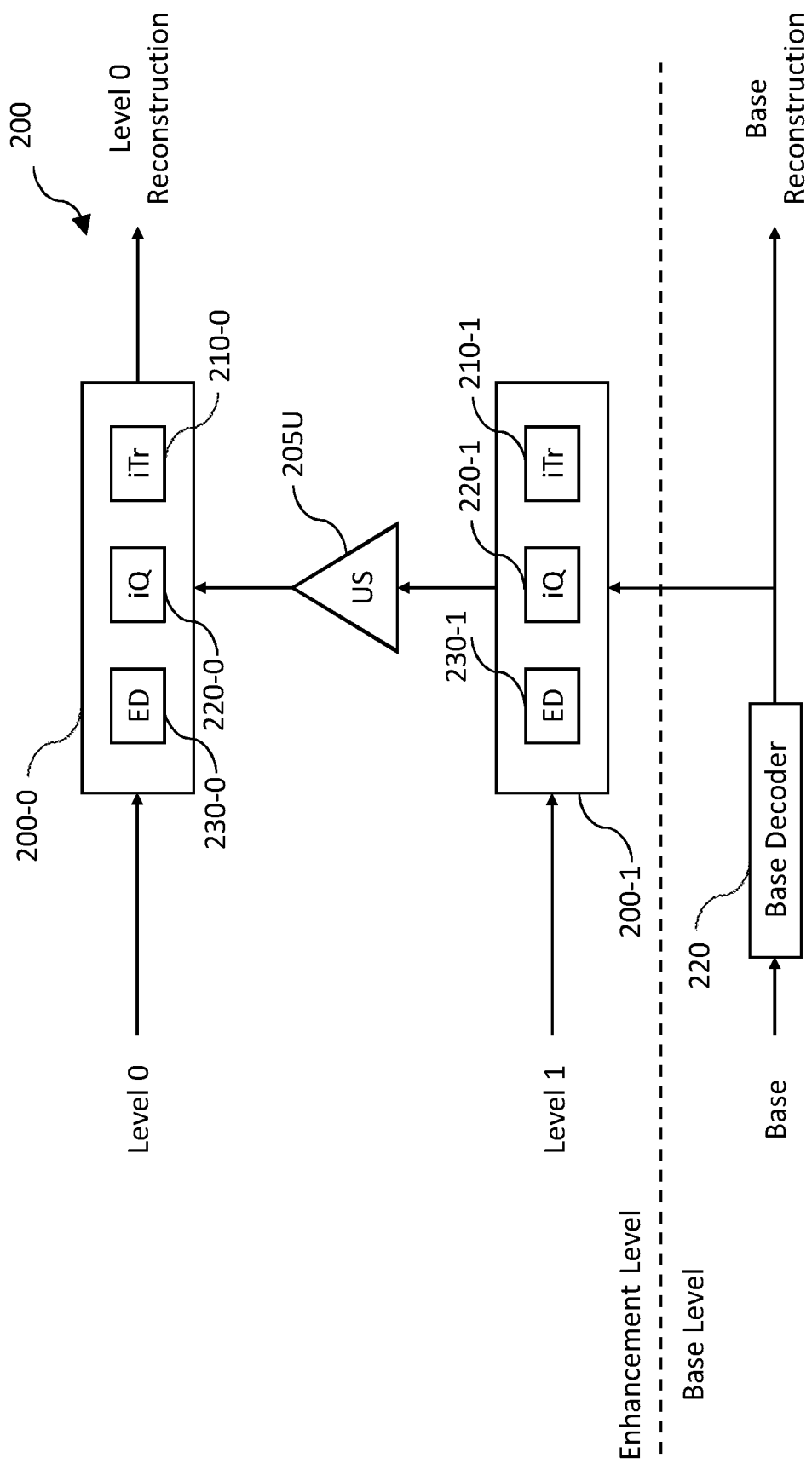
FIG. 2 is a block diagram illustrating a decoding process which corresponds to the encoding process of FIG. 1.

A corresponding decoding process is depicted in the block diagram of FIG. 2. The decoding process is split into two halves as shown by the dashed line. Below the dashed line is the base level of a decoder 200, which may usefully be implemented in hardware. Above the dashed line is the enhancement level, which may usefully be implemented in software. The decoder 200 may comprise only the enhancement level processes, or a combination of the base level processes and enhancement level processes as needed. The decoder 200 may usefully be implemented in software, especially at the enhancement level, and may suitably sit over legacy decoding technology, particularly legacy hardware technology. By legacy technology, it is meant older technology previously developed and sold which is already in the marketplace, and which would be inconvenient and/or expensive to replace, and which may still serve a purpose for decoding signals.

The decoder topology at a general level is as follows. The decoder 200 comprises an input (not shown) for receiving one or more input signals comprising the encoded base stream, the encoded level 1 stream, and the encoded level 0 stream together with optional headers containing further decoding information. The decoder 200 comprises a base decoder 220 at the base level, and processing blocks 200-1 and 200-0 at the enhancement level. An up-sampler 205U is also provided between the processing blocks 200-1 and 200-0 to provide processing block 200-0 with an up-sampled version of a signal output by processing block 200-1.

The decoder 200 receives the one or more input signals and directs the three streams generated by the encoder 100. The encoded base stream is directed to and decoded by the base decoder 220, which corresponds to the base codec 120 used in the encoder 100, and which acts to reverse the encoding process at the base level. The encoded level 1 stream is processed by block 200-1 of decoder 200 to recreate the first residuals created by encoder 100. Block 200-1 corresponds to the processing block 100-1 in encoder 100, and at a basic level acts to reverse or substantially reverse the processing of block 100-1. The output of the base decoder 220 is combined with the first residuals obtained from the encoded level 1 stream. The combined signal is up-sampled by up-sampler 205U. The encoded level 0 stream is processed by block 200-0 to recreate the further residuals created by the encoder 100. Block 200-0 corresponds to the processing block 100-0 of the encoder 100, and at a basic level acts to reverse or substantially reverse the processing of block 100-0. The up-sampled signal from up-sampler 205U is combined with the further residuals obtained from the encoded level 0 stream to create a level 0 reconstruction of the input signal 10.

As noted above, the enhancement stream may comprise two streams, namely the encoded level 1 stream (a first level of enhancement) and the encoded level 0 stream (a second level of enhancement). The encoded level 1 stream provides a set of correction data which can be combined with a decoded version of the base stream to generate a corrected picture.

Figure 3:
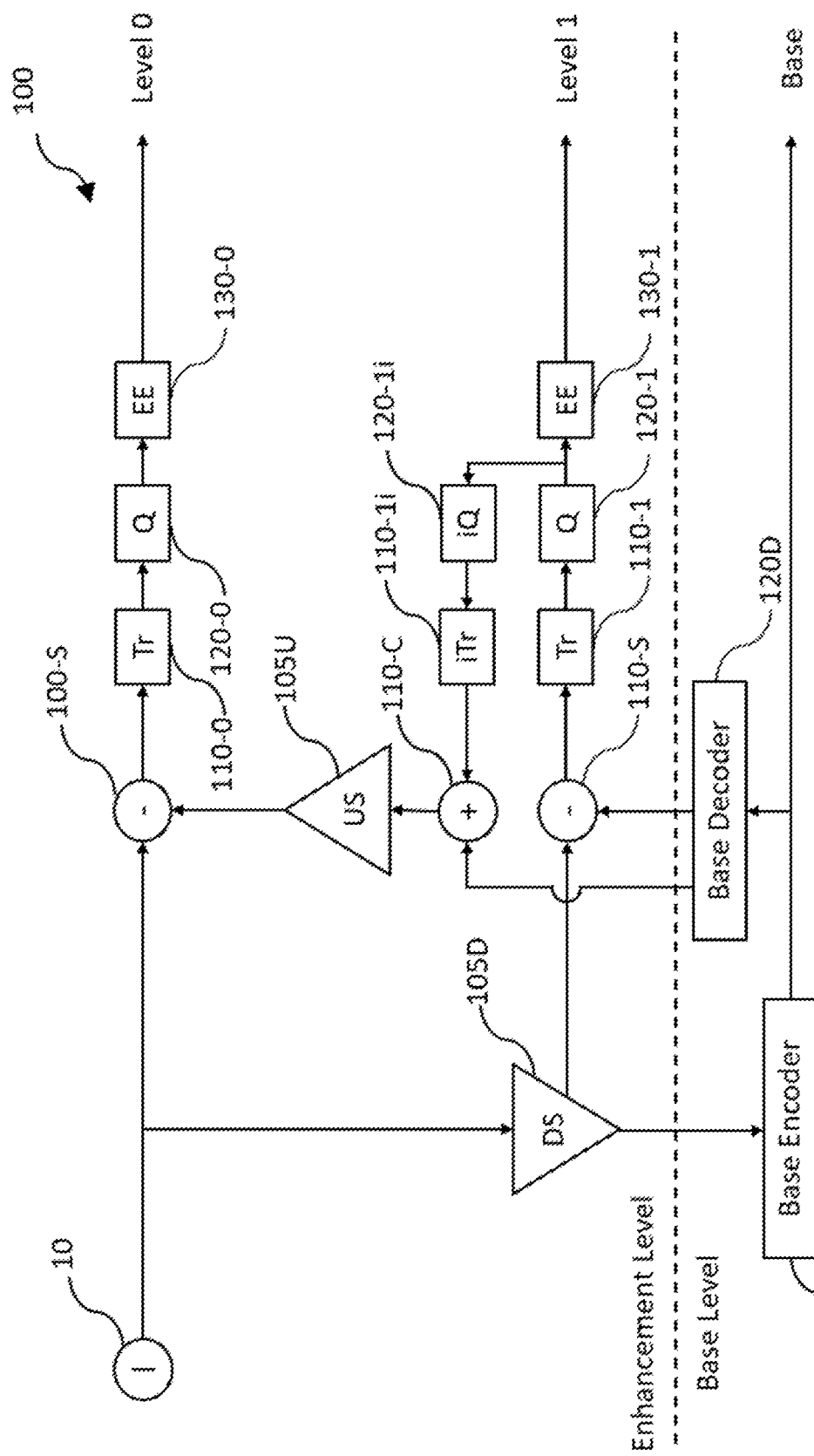
FIG. 3 is a block diagram illustrating the encoding process of FIG. 1 in more detail.

FIG. 3 shows the encoder 100 of FIG. 1 in more detail. The encoded base stream is created directly by the base encoder 120E, and may be quantised and entropy encoded as necessary. In certain cases, these latter processes may be performed as part of the encoding by the base encoder 120E. To generate the encoded level 1 stream, the encoded base stream is decoded at the encoder 100 (i.e. a decoding operation is applied at base decoding block 120D to the encoded base stream). The base decoding block 120D is shown as part of the base level of the encoder 100 and is shown separate from the corresponding base encoding block 120E. For example, the base decoder 120D may be a decoding component that complements an encoding component in the form of the base encoder 120E with a base codec. In other examples, the base decoding block 120D may instead be part of the enhancement level and in particular may be part of processing block 100-1.

Returning to FIG. 3, a difference between the decoded base stream output from the base decoding block 120D and the down-sampled input video is created (i.e. a subtraction operation 110-S is applied to the down-sampled input video and the decoded base stream to generate a first set of residuals). Here the term residuals is used in the same manner as that known in the art; that is, residuals represent the error or differences between a reference signal or frame and a desired signal or frame. Here the reference signal or frame is the decoded base stream and the desired signal or frame is the down-sampled input video. Thus the residuals used in the first enhancement level can be considered as a correction signal as they are able to 'correct' a future decoded base stream to be the or a closer approximation of the down-sampled input video that was used in the base encoding operation. This is useful as this can correct for quirks or other peculiarities of the base codec. These include, amongst others, motion compensation algorithms applied by the base codec, quantisation and entropy encoding applied by the base codec, and block adjustments applied by the base codec.

The first set of residuals are processed at block 100-1 in FIG. 1. The components of this block are shown in more detail in FIG. 3. In particular, the first set of residuals are transformed, quantized and entropy encoded to produce the encoded level 1 stream (i.e. a transform operation 110-1 is applied to the first set of residuals; a quantization operation 120-1 is applied to the transformed set of residuals to generate a set of quantized residuals; and, an entropy encoding operation 130-1 is applied to the quantized set of residuals to generate the encoded level 1 stream at the first level of enhancement). However, it should be noted that the transform, quantisation and entropy encoding are not necessary, and the residuals may be used in raw format. For example, if a high-speed transmission medium is available, e.g. such as fibre optic cable that allows lossless transmission, then the residuals may be sent to the decoder without transformation, quantisation and entropy encoding. This may be the case, for example, in a video production environment (e.g. transmission from a set to a recording studio). Also, it should be noted that only the quantisation step 120-1 may be performed, or only the transform step 110-1. Entropy encoding may not be used, or may optionally be used in addition to one or both of the transform step 110-1 and quantisation step 120-1. The entropy encoding operation can be any suitable type of entropy encoding, such as a Huffmann encoding operation or a run-length encoding (RLE) operation, or a combination of both a Huffmann encoding operation and a RLE operation.

As noted above, the enhancement stream may comprise the encoded level 1 stream (the first level of enhancement) and the encoded level 0 stream (the second level of enhancement). The first level of enhancement may be considered to enable a corrected video at a base level, that is, for example to correct for encoder quirks. The second level of enhancement may be considered to be a further level of enhancement that is usable to convert the corrected video to the original input video or a close approximation thereto. For example, the second level of enhancement may add fine detail that is lost during the downsampling and/or help correct from errors that are introduced by one or more of the transform operation 110-1 and the quantization operation 120-1.

Referring to both FIG. 1 and FIG. 3, to generate the encoded level 0 stream, a further level of enhancement information is created by producing and encoding a further set of residuals at block 100-0. The further set of residuals are the difference between an up-sampled version (via up-sampler 105U) of a corrected version of the decoded base stream (the reference signal or frame), and the input signal 10 (the desired signal or frame).

To achieve a reconstruction of the corrected version of the decoded base stream as would be generated at the decoder 200, at least some of the processing steps of block 100-1 are reversed to mimic the processes of the decoder 200, and to account for at least some losses and quirks of the transform and quantisation processes. To this end, block 100-1 comprises an inverse quantise block 120-1i and an inverse transform block 110-1i. The quantized first set of residuals are inversely quantized at inverse quantise block 120-1i and are inversely transformed at inverse transform block 110-1i in the encoder 100 to regenerate a decoder-side version of the first set of residuals.

The decoded base stream from decoder 120D is combined with the decoder-side version of the first set of residuals (i.e. a summing operation 110-C is performed on the decoded base stream and the decoder-side version of the first set of residuals). Summing operation 110-C generates a reconstruction of the down-sampled version of the input video as would be generated in all likelihood at the decoder—i.e. a reconstructed base codec video). As illustrated in FIG. 1 and FIG. 3, the reconstructed base codec video is then up-sampled by up-sampler 105U.

The up-sampled signal (i.e. reference signal or frame) is then compared to the input signal 10 (i.e. desired signal or frame) to create a further set of residuals (i.e. a difference operation 100-S is applied to the up-sampled re-created stream to generate a further set of residuals). The further set of residuals are then processed at block 100-0 to become the encoded level 0 stream (i.e. an encoding operation is then applied to the further set of residuals to generate the encoded further enhancement stream).

In particular, the further set of residuals are transformed (i.e. a transform operation 110-0 is performed on the further set of residuals to generate a further transformed set of residuals). The transformed residuals are then quantized and entropy encoded in the manner described above in relation to the first set of residuals (i.e. a quantization operation 120-0 is applied to the transformed set of residuals to generate a further set of quantized residuals; and, an entropy encoding operation 120-0 is applied to the quantized further set of residuals to generate the encoded level 0 stream containing the further level of enhancement information). However, it should be noted that the transform, quantisation and entropy encoding are not necessary, and the residuals are useful in raw format, e.g. as described previously. Also, it should be noted that only the quantisation step 120-1 may be performed, or only the transform and quantization step. Entropy encoding may optionally be used in addition. Preferably, the entropy encoding operation may be a Huffmann encoding operation or a run-length encoding (RLE) operation, or both.

Thus, as illustrated in FIGS. 1 and 3 and described above, the output of the encoding process is a base stream at a base level, and one or more enhancement streams at an enhancement level which preferably comprises a first level of enhancement and a further level of enhancement.

Figure 4:
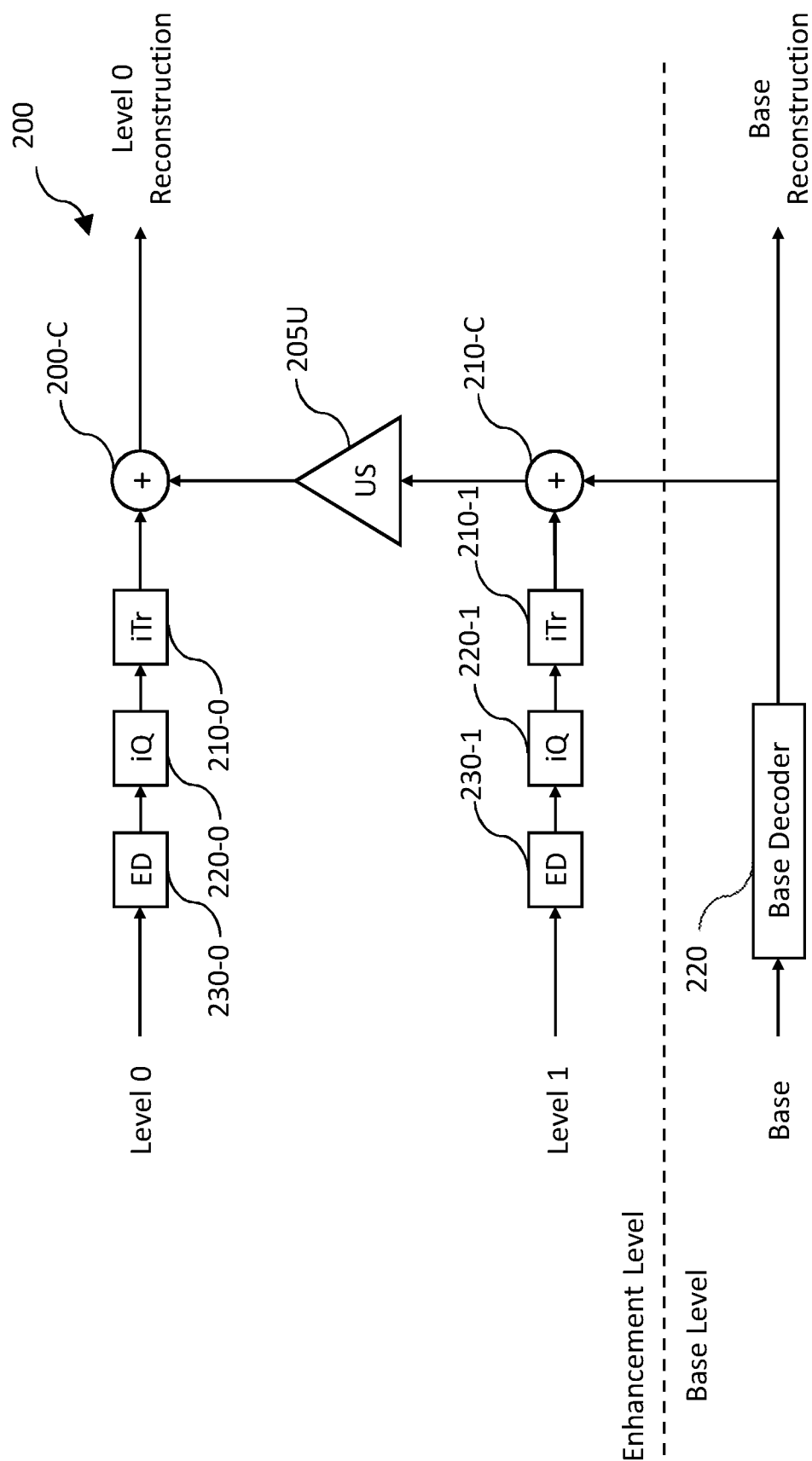
FIG. 4 is a block diagram illustrating the decoding process of FIG. 2 in more detail.

The encoded base stream and one or more enhancement streams are received at the decoder 200. FIG. 4 shows the decoder of FIG. 2 in more detail.

The encoded base stream is decoded at base decoder 220 in order to produce a base reconstruction of the input signal 10 received at encoder 100. This base reconstruction may be used in practice to provide a viewable rendition of the signal 10 at the lower quality level. However, the primary purpose of this base reconstruction signal is to provide a base for a higher quality rendition of the input signal 10. To this end, the decoded base stream is provided to processing block 200-1. Processing block 200-1 also receives encoded level 1 stream and reverses any encoding, quantisation and transforming that has been applied by the encoder 100. Block 200-1 comprises an entropy decoding process 230-1, an inverse quantization process 220-1, and an inverse transform process 210-1. Optionally, only one or more of these steps may be performed depending on the operations carried out at corresponding block 100-1 at the encoder. By performing these corresponding steps, a decoded level 1 stream comprising the first set of residuals is made available at the decoder 200. The first set of residuals is combined with the decoded base stream from base decoder 220 (i.e. a summing operation 210-C is performed on a decoded base stream and the decoded first set of residuals to generate a reconstruction of the down-sampled version of the input video—i.e. the reconstructed base codec video). As illustrated in FIG. 2 and FIG. 4, the reconstructed base codec video is then upsampled by up-sampler 205U.

Additionally, and optionally in parallel, the encoded level 0 stream is processed at block 200-0 of FIG. 2 in order to produce a decoded further set of residuals. Similarly to processing block 100-0, processing block 200-0 comprises an entropy decoding process 230-0, an inverse quantization process 220-0 and an inverse transform process 210-0. Of course, these operations will correspond to those performed at block 100-0 in encoder 100, and one or more of these steps may be omitted as necessary. Block 200-0 produces a decoded level 0 stream comprising the further set of residuals and these are summed at operation 200-C with the output from the up-sampler 205U in order to create a level 0 reconstruction of the input signal 10.

Thus, as illustrated in FIGS. 1 to 4 and described above, the output of the decoding process is a base reconstruction, and an original signal reconstruction at a higher level. This embodiment is particularly well-suited to creating encoded and decoded video at different frame resolutions. For example, the input signal 10 may be an HD video signal comprising frames at 1920×1080 resolution. In certain cases, the base reconstruction and the level 0 reconstruction may both be used by a display device. For example, in cases of network traffic, the level 0 stream may be disrupted more than the level 1 and base streams (as it may contain up to 4× the amount of data where downsampling reduces the dimensionality in each direction by 2). In this case, when traffic occurs the display device may revert to displaying the base reconstruction while the level 0 stream is disrupted (e.g. while a level 0 reconstruction is unavailable), and then return to displaying the level 0 reconstruction when network conditions improve. A similar approach may be applied when a decoding device suffers from resource constraints, e.g. a set-top box performing a systems update may have an operation base decoder 220 to output the base reconstruction but may not have processing capacity to compute the level 0 reconstruction.

The encoding arrangement of FIGS. 1 and 3 also enables video distributors to distribute video to a set of heterogeneous devices; those with just a base decoder 220 view the base reconstruction, whereas those with the enhancement level may view a higher-quality level 0 reconstruction. In comparative cases, two full video streams at separate resolutions were required to service both sets of devices. As the level 0 and level 1 enhancement streams encode residual data, the level 0 and level 1 enhancement streams may be more efficiently encoded, e.g. distributions of residual data typically have much of their mass around 0 (i.e. where there is no difference) and typically take on a small range of values about 0. This may be particularly the case following quantisation. In contrast, full video streams at different resolutions will have different distributions with a non-zero mean or median that require a higher bit rate for transmission to the decoder.

Description of Tools

It was noted above how a set of tools may be applied to each of the enhancement streams (or the input video) throughout the process. The following provides a summary each of the tools and their functionality within the overall process as illustrated in FIGS. 1 to 4.

Down-Sampling

The down-sampling process is applied to the input video to produce a down-sampled video to be encoded by a base codec. Typically, down-sampling reduces a picture resolution. The down-sampling can be done either in both vertical and horizontal directions, or alternatively only in the horizontal direction. Any suitable down-sampling process may be used.

Level 1 (L-1) Encoding

The input to this tool comprises the L-1 residuals obtained by taking the difference between the decoded output of the base codec and the down-sampled video. The L-1 residuals are then transformed, quantized and encoded.

Transform

The transform tool uses a directional decomposition transform such as a Hadamard-based transform.

There are two types of transforms that are particularly useful in the process. Both have a small kernel (i.e. 2×2 or 4×4) which is applied directly to the residuals. More details on the transform can be found for example in patent applications PCT/EP2013/059847 or PCT/GB2017/052632, which are incorporated herein by reference. In a further example, the encoder may select between different transforms to be used, for example between the 2×2 kernel and the 4×4 kernel. This enables further flexibility in the way the residuals are encoded. The selection may be based on an analysis of the data to be transformed.

The transform may transform the residual information to four planes. For example, the transform may produce the following components: average, vertical, horizontal and diagonal.

Quantization

Any known quantization scheme may be useful to create the residual signals into quanta, so that certain variables can assume only certain discrete magnitudes.

Entropy Coding

The quantized coefficients are encoded using an entropy coder. In a scheme of entropy coding, the quantized coefficients are first encoded using run length encoding (RLE), then the encoded output is processed using a Huffman encoder. However, only one of these schemes may be used when entropy encoding is desirable.

Level 1 (L-1) Decoding

The input to this tool comprises the L-1 encoded residuals, which are passed through an entropy decoder, a de-quantiser and an inverse transform module. The operations performed by these modules are the inverse operations performed by the modules described above.

Up-Sampling

The combination of the decoded L-1 residuals and base decoded video is up-sampled in order to generate an up-sampled reconstructed video. The up-sampling is described in more detail below.

Level 0 (L-0) Encoding

The input to this tool comprises the L-0 residuals obtained by taking the difference between the up-sampled reconstructed video and the input video. The L-0 residuals are then transformed, quantized and encoded as further described below. The transform, quantization and encoding are performed in the same manner as described in relation to L-1 encoding.

Level 0 (L-0) Decoding

The input to this tool comprises the encoded L-0 residuals. The decoding process of the L-0 residuals are passed through an entropy decoder, a de-quantizer and an inverse transform module. The operations performed by these modules are the inverse operations performed by the modules described above.

Residuals Data Structure

In the encoding/decoding algorithm described above, there are typically 3 planes of data (e.g., YUV or RGB for image or video data), with two level of qualities (LoQs) which are described as level 0 (or LoQ-0 or top level, full resolution) and level 1 (LoQ-1 or lower level, reduced-size resolution, such as half resolution) in every plane.

Upsampling

Frame Up-Sampling in General

As described above, before the level 0 (LoQ-0) residual calculations and transforms are performed, a down-sampled data frame is reconstructed at the level 1 (LoQ-1) stage and then this reconstructed frame is up-sampled (at up-sampler 105U in the encoder 100, and up-sampler 205U in the decoder 200) in order to be resized to the frame size required for the LoQ-0 process. This section discusses up-sampling techniques that may be configured to perform the up-sampling.

There are various up-sampling techniques that could be used including the Lanczos technique. Just by way of example there are three different techniques described here, namely: nearest up-sampling; bilinear up-sampling; and bicubic up-sampling. The approaches described herein are configured to provide up-sampling that is compatible with the present encoding and decoding scheme and that provides perceptually beneficial results, e.g. that does not introduce artifacts when used with the residual processing described herein. In certain cases, comparative up-sampling approaches may introduce artifacts that degrade a level 0 reconstruction, e.g. as output by a decoder. In certain cases, the described up-sampling approaches enable the level 0 residuals to efficiently correct (e.g. improve) an up-sampled decoded base stream with applied decoded level 1 residuals, e.g. in a manner that provides for efficient encoding of the level 0 stream and transmission over a network.

Border Regions

In certain examples, up-sampling may be performed differently depending on a location within a source frame (e.g. a pixel within a reconstructed video frame as input to upsamplers 105U and 205U). In one case, a source frame may be split into portions or regions that are processed differently. These regions may be defined based on a border of the source frame, e.g. regions that extend from one or more edges of the source frame.

FIGS. 5A and 5B show two examples of how a frame to be up-sampled may be divided. Each frame to be up-sampled, called a source frame 510, is divided into two major parts, namely a center area 510C, and a border area 510B. FIG. 5A shows an example arrangement for bilinear and bicubic up-sampling methods. In FIG. 5A, the border area 510B consists of four segments, namely top segment 510BT, left segment 510BL, right segment 510BR, and bottom segment 510BB. FIG. 5B shows an example arrangement for a nearest up-sampling method. In FIG. 5B, the border area 510B consists of 2 segments; right segment 510BR and bottom segment 510BB. In both examples, the segments may be defined by a border-size parameter (BS), e.g. which sets a width of the segment (i.e. a length that the segment extends into the source frame from an edge of the frame). The border-size may be set to be 2 pixels for bilinear and bicubic up-sampling methods or 1 pixel for the nearest method.

In use, determining whether a source frame pixel is located within a particular segment may be performed based on a set of defined pixel indices (e.g. in x and y directions). Performing differential upsampling based on whether a source frame pixel is within a centre area 510C or a border area 510B may help avoid border effects that may be introduced due to the discontinuity at the source frame edges.

Nearest Up-Sampling

Figure 6:
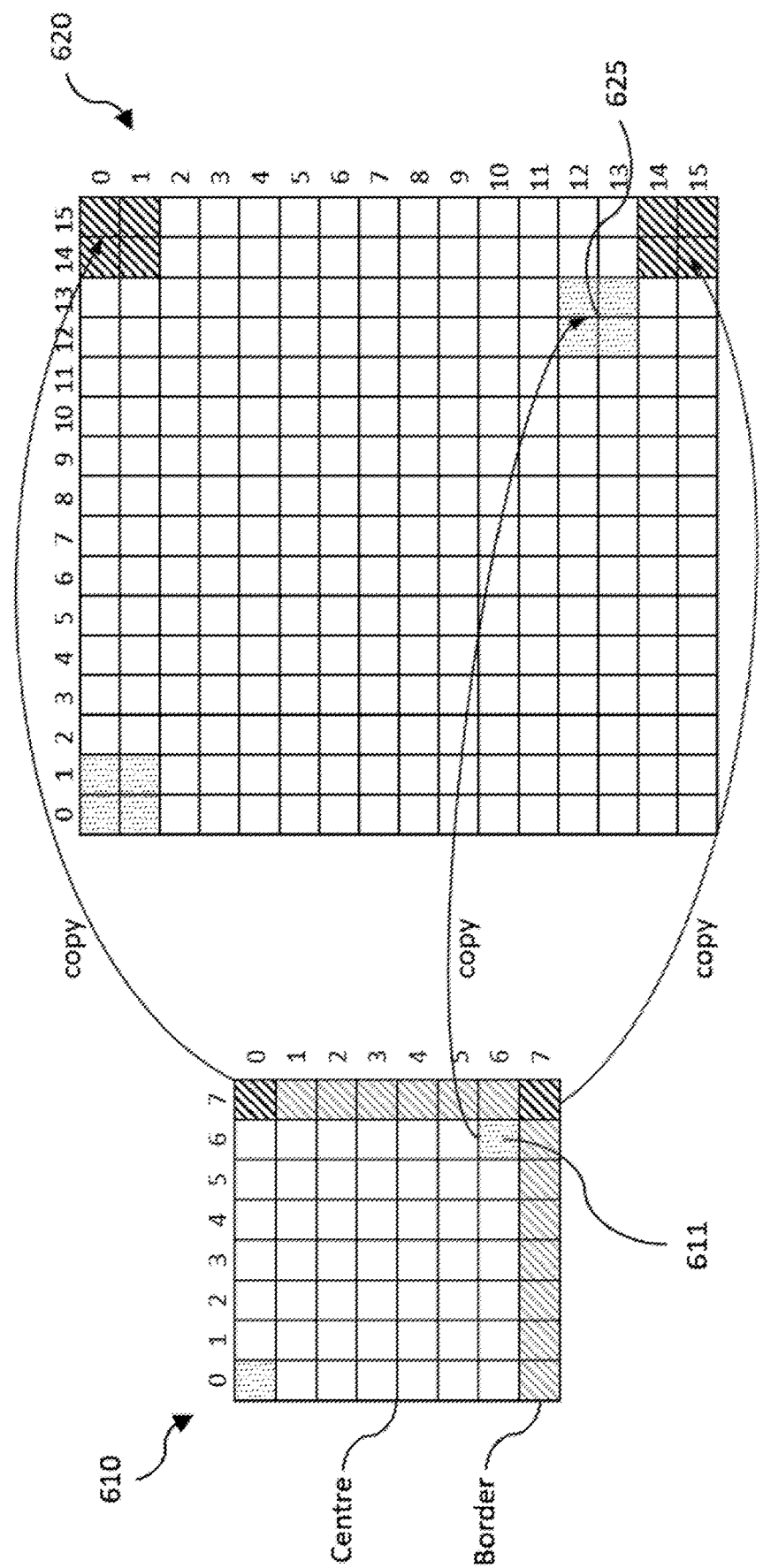
FIG. 6 is an overview of how a frame is up-sampled using a nearest up-sampling method.

FIG. 6 is an overview of how a frame is up-sampled using a nearest up-sampling method.

Referring to FIG. 6, a source frame 610 is up-sampled to become destination frame 620. The nearest up-sampling method up-samples by copying a current source pixel 611 onto a 2×2 destination grid 625 of destination pixels 621. The destination pixel positions are calculated by doubling the index of the source pixel 611 on both axes and progressively adding +1 to each axis to extend the range to cover 4 pixels as shown on the right hand side of FIG. 6. For example, the value of source pixel 611 with index location (x=6, y=6) is copied to destination grid 625 comprising pixels 621 with index locations (12, 12) (13, 12) (12, 13) and (13, 13). Each pixel 621 in the destination grid 625 takes the value of the source pixel 611.

The nearest method of upsampling provides enables fast implementations that may be preferable for embedded devices with limited processor resources. However, the nearest method has a disadvantage that blocking or "pixilation" artifacts may need to be corrected by the level 0 residuals (e.g. that result in more non-zero residual values that require more bits for transmission following entropy encoding). In certain examples described below, bilinear and bicubic upsampling may result in a set of level 0 residuals that can be more efficiently encoded, e.g. that require fewer bits following quantisation and entropy encoding. For example, bilinear and bicubic upsampling may generate an upsampled output that more accurately matches the input signal 10, leading to smaller level 0 residual values.

Bilinear Up-Sampling

Figures 7A, 7B:
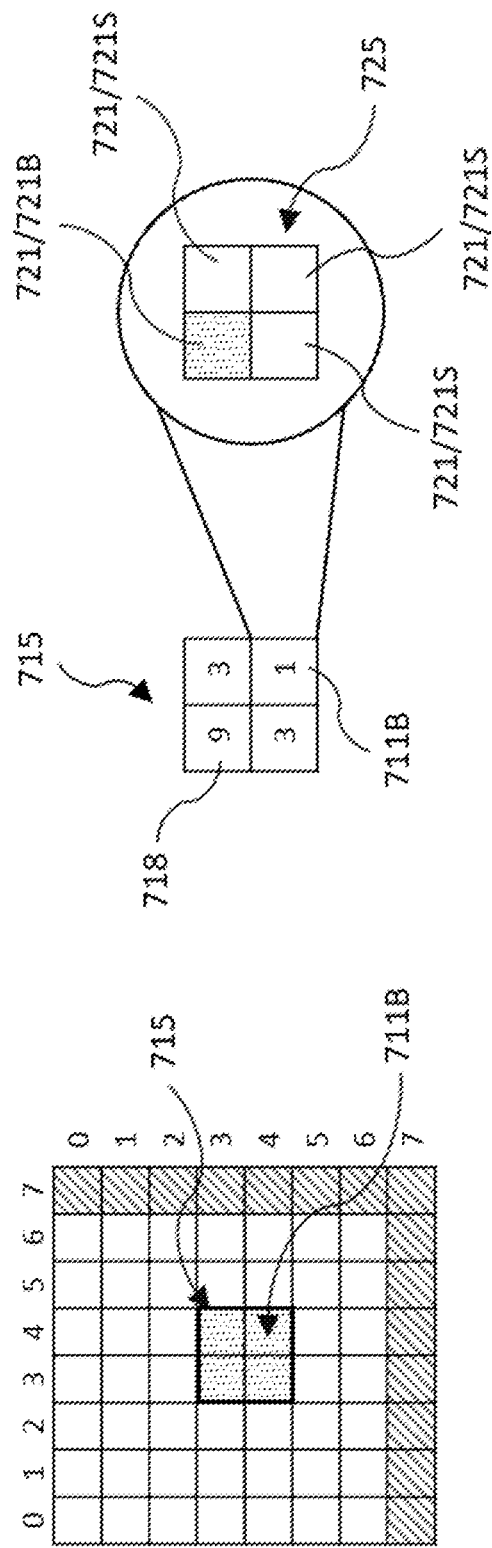
FIGS. 7A, 7B and 7C together provide an overview of how a frame is up-sampled using a bilinear up-sampling method.
Figure 7C:
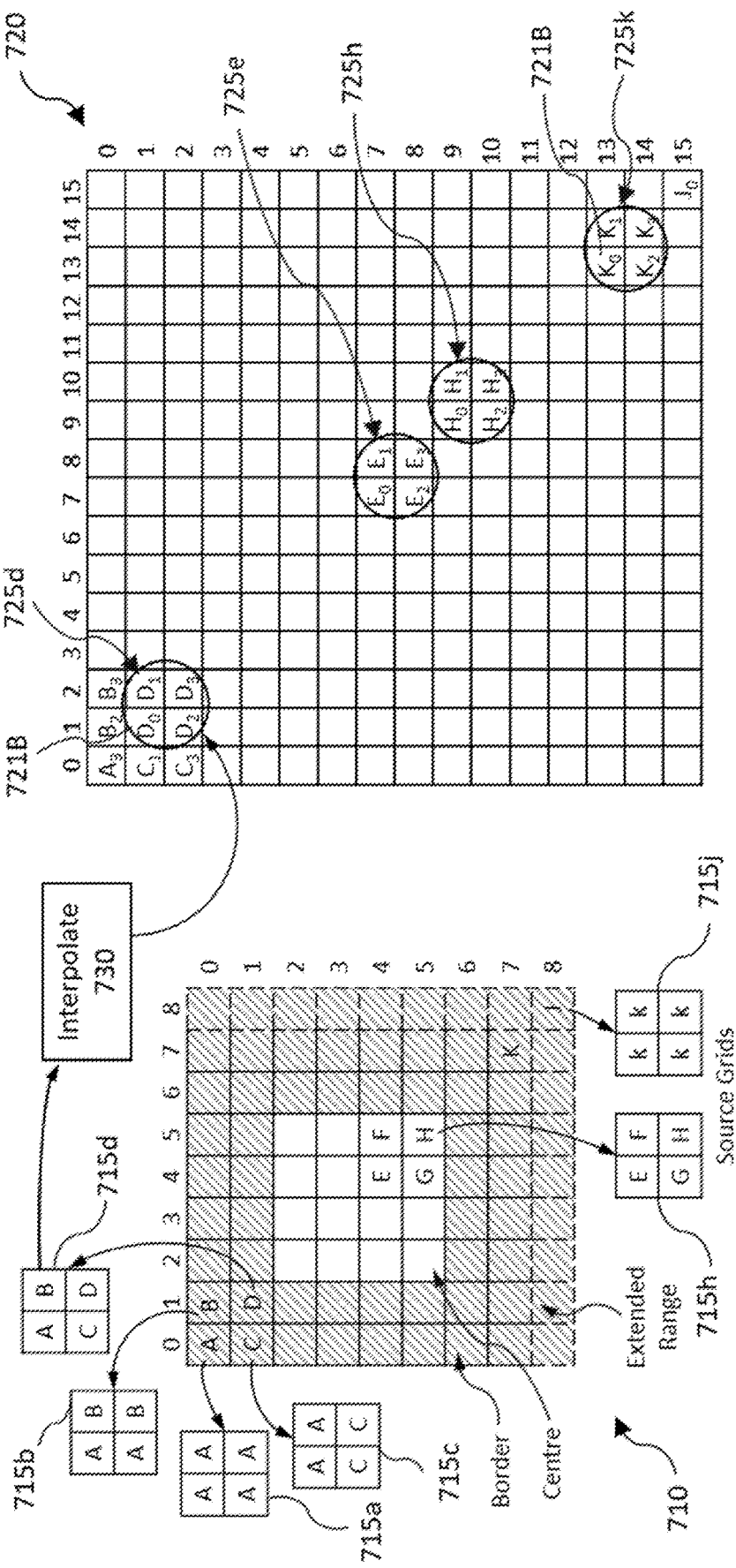

FIGS. 7A, 7B and 7C illustrate a bilinear up-sampling method. The bilinear up-sampling method can be divided into three main steps. The first step involves constructing a 2×2 source grid 715 of source pixels 711 in the source frame 710. The second step involves performing a bilinear interpolation. The third step involves writing the interpolation result to destination pixels 721 in the destination frame 720.

Step 1: Source Pixel Grid

FIG. 7A illustrates a construction example of the 2×2 source grid 715 (which may also be called a bilinear grid). The 2×2 source grid 715 is used instead of a source pixel 611 because the bilinear up-sampling method performs up-sampling by considering the values of the nearest 3 pixels to a base pixel 711B, i.e. the nearest 3 pixels falling within the 2×2 source grid 715. In this example, the base pixel 711B is at the bottom right of the 2×2 source grid 715, but other positions are possible. During the bilinear up method the 2×2 source grid 715 may be determined for multiple source frame pixels, so as to iteratively determine destination frame pixel values for the whole destination frame. The base pixel 711B location is used to determine an address of a destination frame pixel.

Step 2: Bilinear Interpolation

FIG. 7B illustrates a bilinear coefficient derivation. In this example, the bilinear interpolation is a weighted summation of the values of the four pixels in the 2×2 source grid 715. The weighted summation is used as the pixel value of a destination pixel 721 being calculated. The particular weights employed are dependent on the position of the particular destination pixel 721 in a 2×2 destination grid 725. In this example, the bilinear interpolation applies weights to each source pixel 711 in the 2×2 source grid 715, using the position of the destination pixel 721 in the 2×2 destination grid 725. For example, if calculating the value for the top left destination pixel (shown as 721/721B in FIG. 7B), then the top left source pixel value will receive the largest weighting coefficient 718 (e.g. weighting factor 9) while the bottom right pixel value (diagonally opposite) will receive the smallest weighting coefficient (e.g. weighting factor 1), and the remaining two pixel values will receive an intermediate weighting coefficient (e.g. weighting factor 3). This is visualized in FIG. 7B with the weightings shown in the 2×2 source grid 715.

For the pixel on the right of 721/721B within the 2×2 destination grid 725, the weightings applied to the weighted summation would change as follows: the top right source pixel value will receive the largest weighting coefficient (e.g. weighting factor 9) while the bottom left pixel value (diagonally opposite) will receive the smallest weighting coefficient (e.g. weighting factor 1), and the remaining two pixel values will receive an intermediate weighting coefficient (e.g. weighting factor 3).

In FIG. 7B, four destination pixels are computed for the base pixel 711B based on the 2×2 source grid 715 but each destination pixel is determined using a different set of weights. These weights may be thought of as an upsampling kernel. In this way, there may be four different sets of four weighted values that are applied to the original pixel values within the 2×2 source grid 715 to generate the 2×2 destination grid 725 for the base pixel 711B. After the four destination pixel values are determined, another base pixel is selected with a different source grid and the process begins again to determine the next four destination pixel values. This may be iteratively repeated until pixel values for the whole destination (e.g. upsampled) frame are determined. The next section describes in more detail the mapping of these interpolated pixel values from the source frame 710 to the destination frame 720.

Step 3: Destination Pixels

FIG. 7C shows an overview of the bilinear up-sampling method comprising a source frame 710, a destination frame 720, an interpolation module 730, a plurality of 2×2 source grids 715 (a,b,c,d,h,j), and a plurality of 2×2 destination grids 725 (d,e,h,k). The source frame 710 and destination frame 720 have indexes starting from 0 on each column and row for pixel addressing (although other indexing schemes may be used).

In general, each of the weighted averages generated from each 2×2 source grid 715 is mapped to a corresponding destination pixel 721 in the corresponding 2×2 destination grid 725. The mapping uses the source base pixel 711B of each 2×2 source grid 715 to map to a corresponding destination base pixel 721B of the corresponding 2×2 destination grid 725, unlike the nearest sampling method. The destination base pixel 721B address is calculated from the equation (applied for both axes):

$$\text{Dst\_base\_addr} = (\text{Src\_base\_address} \times 2) - 1 \quad \text{[equation 1]}$$

Also, the destination pixels have three corresponding destination sub-pixels 721S calculated from the equation:

$$\text{Dst\_sub\_addr} = \text{Dst\_base\_addr} + 1 \text{ (for both axes)} \quad \text{[equation 2]}$$

And so each 2×2 destination grid 725 generally comprises a destination base pixel 721B together with three destination sub pixels 721S, one each to the right, below, and diagonally down to the right of the destination base pixel, respectively. This is shown in FIG. 7B. However, other configurations of destination grid and base pixel are possible.

The calculated destination base and sub addresses for destination pixels 721B and 721S respectively can be out of range on the destination frame 720. For example, pixel A (0, 0) on source frame 710 generates a destination base pixel address (−1, −1) for a 2×2 destination grid 725. Destination address (−1, −1) does not exist on the destination frame 720. When this occurs, writes to the destination frame 720 are ignored for these out of range values. This is expected to occur when up-sampling the border source frames. However, it should be noted that in this particular example one of the destination sub-pixel addresses (0, 0) is in range on the destination frame 720. The weighted average value of the 2×2 source grid 715 (i.e. based on the lower left pixel value taking the highest weighting) will be written to address (0, 0) on the destination frame 720. Similarly, pixel B (1, 0) on source frame 710 generates a destination base pixel address (1, −1) which is out of range because there is no −1 row. However, the destination sub-pixel addresses (1, 0) and (2, 0) are in range and the corresponding weighted sums are each entered into the corresponding addresses. Similar happens for pixel C, but only the two values on the column 0 are entered (i.e. addresses (0, 1) and (0, 2)). Pixel D at address (1, 1) of the source frame contributes a full 2×2 destination grid 725d based on the weighted averages of source grid 715d, as do pixels E, H and K, with 2×2 destination grids 725e, 725h, and 725k and corresponding source grids 715e, 715h and 715k illustrated in FIG. 7C.

As will be understood, these equations usefully deal with the border area 510B and its associated segments, and ensure that when the centre 510C segment is up-sampled it will remain in the centre of the destination frame 720. Any pixel values that are determined twice using this approach, e.g. due to the manner in which the destination sub-pixels are determined, may be ignored or overwritten.

Furthermore, the ranges for border segments 520BR and 520BB are extended by +1 in order to fill all pixels in the destination frame. In other words, the source frame 710 is extrapolated to provide a new column of pixels in border segment 520BR (shown as index column number 8 in FIG. 7C), and a new row of pixels in border segment 520BB (shown as index row number 8 in FIG. 7C).

Bicubic Up-Sampling

Figure 8B:
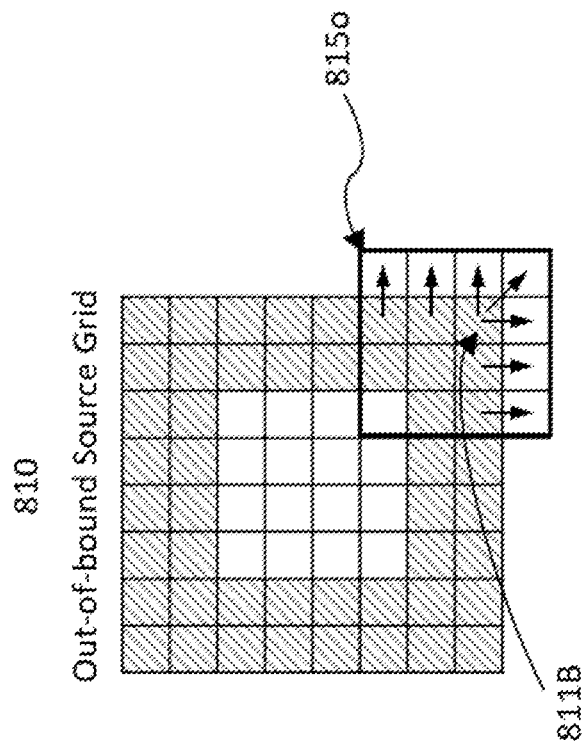
FIGS. 8A and 8B together provide an overview of how a frame is up-sampled using a bicubic up-sampling method.
Figure 8A:
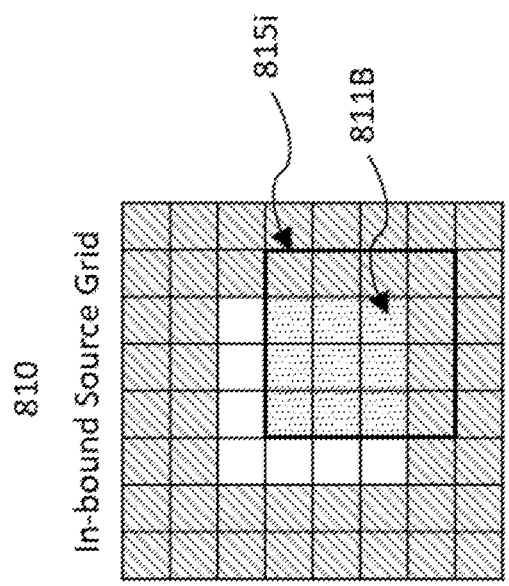

FIGS. 8A, and 8B together illustrate a bicubic up-sampling method. The bicubic up-sampling method may be used to implement one or more of the upsampler 105U, 205U. The bicubic up-sampling method can be divided into three main steps. The first step involves constructing a 4×4 source grid 815 of source pixels with a base pixel 811B positioned at the local index (2, 2) within the 4×4 source grid 815. The second step involves performing a bicubic interpolation. The third step involves writing the interpolation result to the destination pixels.

Step 1: Source Pixel Grid

FIG. 8A shows a 4×4 source grid 815 construction on source frame 810 for an in-bound grid 815i and separately an out-of-bound grid 815o. In this example, "in-bound" refers to the fact that the grid covers source pixels that are within the source frame, e.g. the centre region 510C and the border regions 510B; "out-of-bound" refers to the fact that the grid includes locations that are outside of the source frame. The bicubic up-sampling method is performed by using the 4×4 source grid 815 which is subsequently multiplied by a 4×4 kernel. This kernel may be called an up-sampling kernel. During the generation of the 4×4 source grid 815, any pixels which fall outside the frame limits of the source frame 810 (e.g. those shown in out of bounds grid 815o) are replaced with the value of the source pixels 811 the at the boundary of the source frame 810.

Step 2: Bicubic Interpolation

The kernels used for the bicubic up-sampling process typically have a 4×4 coefficient grid. However, the relative position of the destination pixel with reference to the source pixel will yield a different coefficient set, and since the up-sampling is a factor of two in this example, there will be 4 sets of 4×4 kernels used in the up-sampling process. These sets are represented by a 4-dimensional grid of coefficients (2×2×4×4). For example, there will be one 4×4 kernel for each destination pixel in a 2×2 destination grid, that represents a single upsampled source pixel 811B.

In one case, the bicubic coefficients may be calculated from a fixed set of parameters. In one case, this comprises a core parameter (bicubic parameter) and a set of spline creation parameters. In an example, a core parameter of −0.6 and four spline creation parameters of [1.25, 0.25, −0.75 & −1.75] may be used. An implementation of the filter may use fixed point computations within hardware devices.

Step 3: Destination Pixels

FIG. 8B shows an overview of the bicubic up-sampling method comprising a source frame 810, a destination frame 820, an interpolation module 830, a 4×4 source grid 815, and a 2×2 destination grid 825. The source frame 810 and destination frame 820 have indexes starting from 0 on each column and row for pixel addressing (although other addressing schemes may be used).

Similarly to the bilinear method, the bicubic destination pixels have a base address calculated from the equation for both axes:

$$Dst\_base\_addr=(Src\_base\_address \times 2)-1 \qquad [equation\ 1]$$

Also, the destination addresses are calculated from:

$$Dst\_sub\_addr=Dst\_base\_addr+1 (for\ both\ axes) \qquad [equation\ 2]$$

And so, as for the bilinear method, each 2×2 destination grid 825 generally comprises a destination base pixel together with three destination sub pixels, one each to the right, below, and diagonally down to the right of the destination base pixel, respectively. However, other configurations of destination grid and base pixel are possible.

Again, these equations ensure that when the centre segment is up-sampled it will remain in the centre of the destination frame. Furthermore, the ranges for border segments 520BR and 520BB are extended by +1 in order to fill all pixels in the destination frame 820 in the same way as described for the bilinear method. Any pixel values that are determined twice using this approach, e.g. due to the manner in which the destination sub-pixels are determined, may be ignored or overwritten. The calculated destination base and sub addresses can be out of range. When this occurs, writes to the destination frame are ignored for these out of range values. This is expected to occur when up-sampling the border area 520.

Description of Basic Encoding Process

Figure 9:
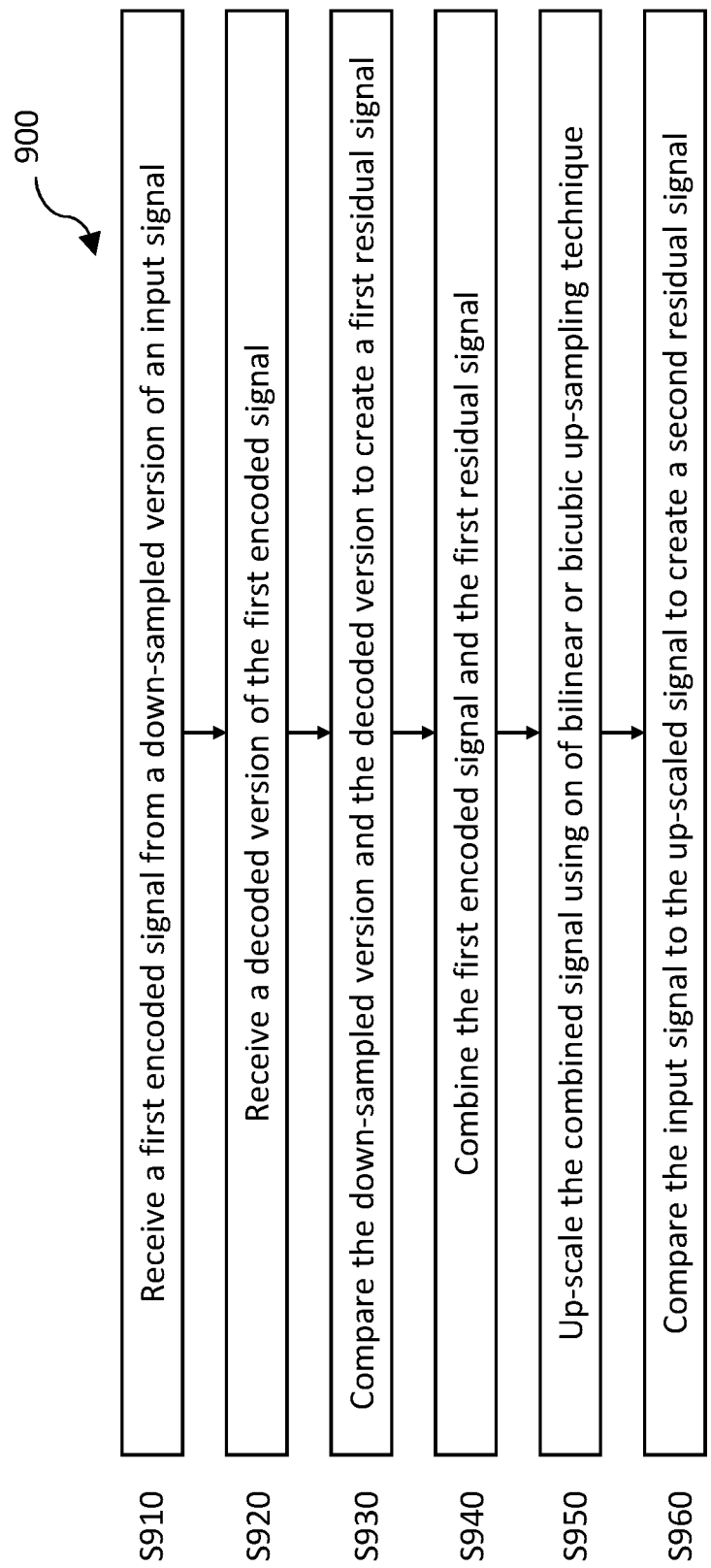
FIG. 9 is a flow chart illustrating an encoding method.

FIG. 9 is a flow chart illustrating a basic encoding method. The method is as follows:

Step 910: receive a base encoded signal that is generated from a down-sampled version of an input signal. In certain cases, this may comprise producing the base encoded signal; in other cases, this may be instructed and producing is performed by a separate entity.

Step 920: receive a decoded version of the base encoded signal. In certain cases, this may comprise decoding the base encoded signal; in other cases, this may be instructed, and the decoding is performed by a separate entity.

Step 930: compare the down-sampled version and the decoded version to create a first residual signal.

Step 940: combine the decoded first encoded signal and the first residual signal.

Step 950: upscale the combined signal using one of bilinear or bicubic up-sampling technique.

Step 960: compare the input signal to the up-scaled signal to create a second residual signal.

Of course, the method may comprise features compatible with the description of FIGS. 1 to 8. In particular, the method may comprise also transforming and inverse transforming the first residual signal.

Figure 10:
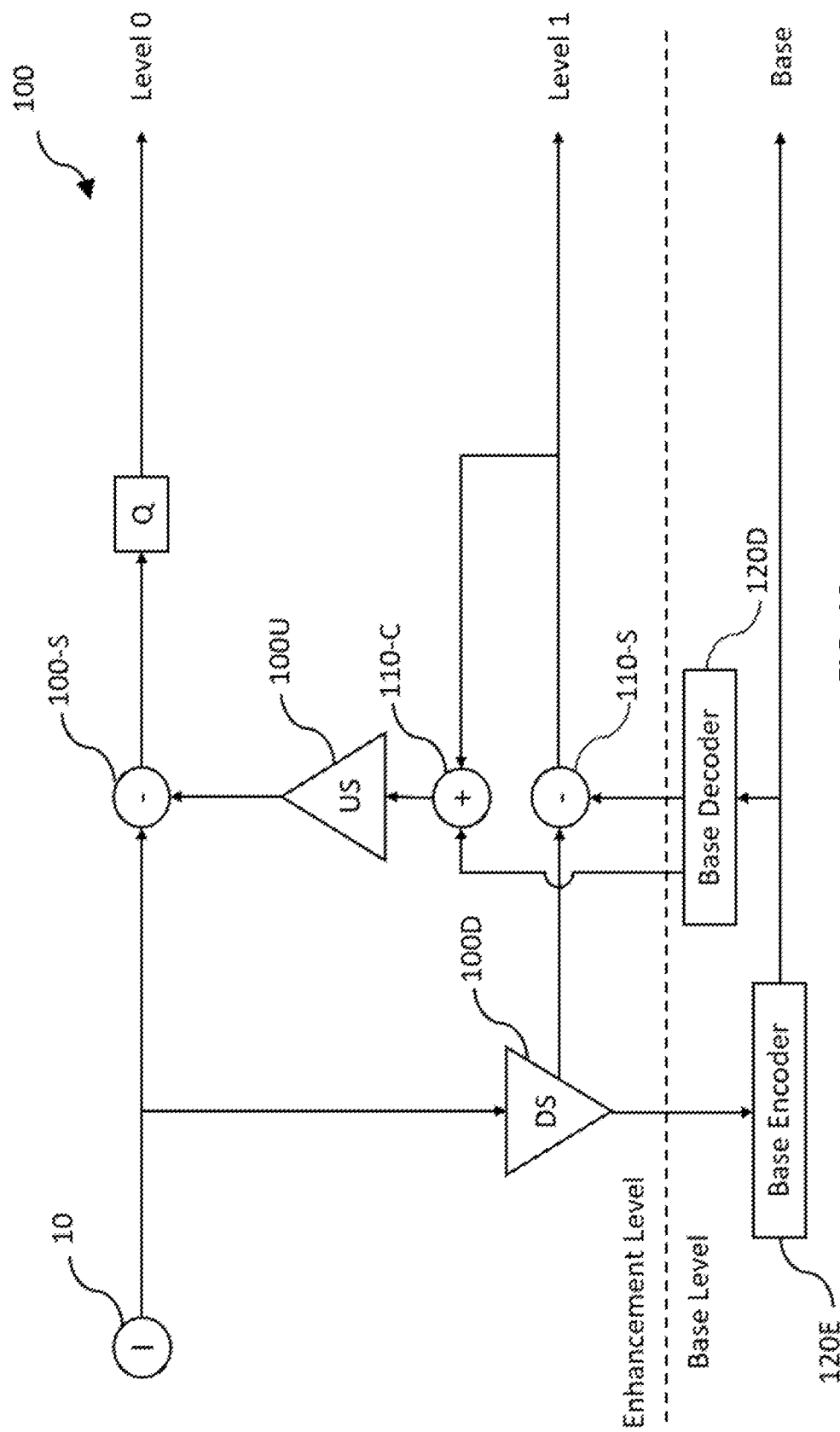
FIG. 10 is the block diagram of the encoder of FIG. 3 modified to show quantisation, transforming and entropy encoding steps removed.

FIG. 10 is the block diagram of the encoder of FIG. 3 modified to show quantisation, transforming and entropy encoding steps removed. This example may be used in situations where residual data streams may be communicated losslessly to the decoder, such as over fibre optic cables and/or where the residuals are stored on a storage medium for future loading by the decoder.

Description of Basic Decoding Process

Figure 11:
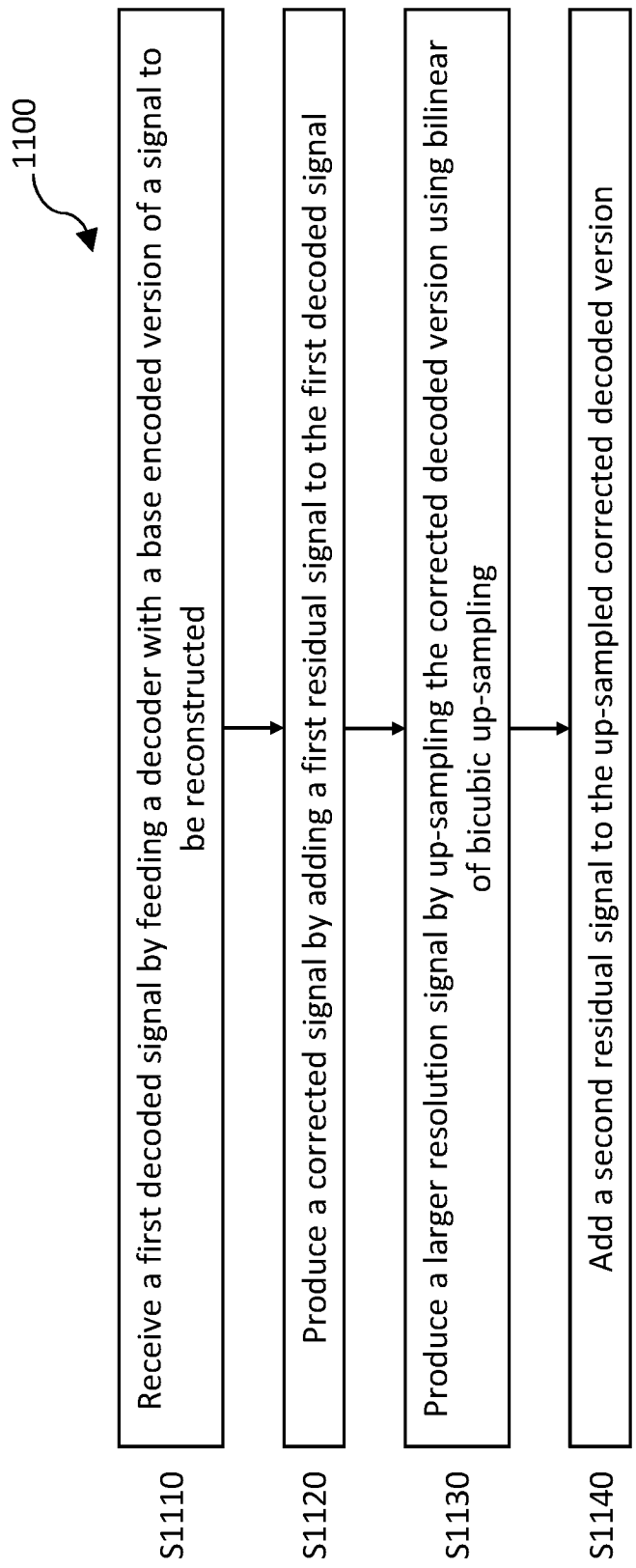
FIG. 11 is a flow chart illustrating a decoding method.

FIG. 11 is a flow chart illustrating a basic decoding method. The method is as follows:

Step 1110: receive a base decoded signal that is generated by feeding a decoder with a base encoded version of a signal to be reconstructed. In certain cases, this may comprise producing the base encoded signal; in other cases, this may be instructed, and the producing is performed by a separate entity.

Step 1120: produce a corrected signal by adding a first residual signal to the base decoded signal.

Step 1130: produce a larger resolution signal by up-sampling the corrected decoded version using bilinear or bicubic up-sampling.

Step 1140: add a second residual signal to the up-sampled corrected decoded version.

Of course, the method may comprise features compatible with the description of FIGS. 1 to 8. In particular, the method may comprise also transforming and inverse transforming the first residual signal.

Figure 12:
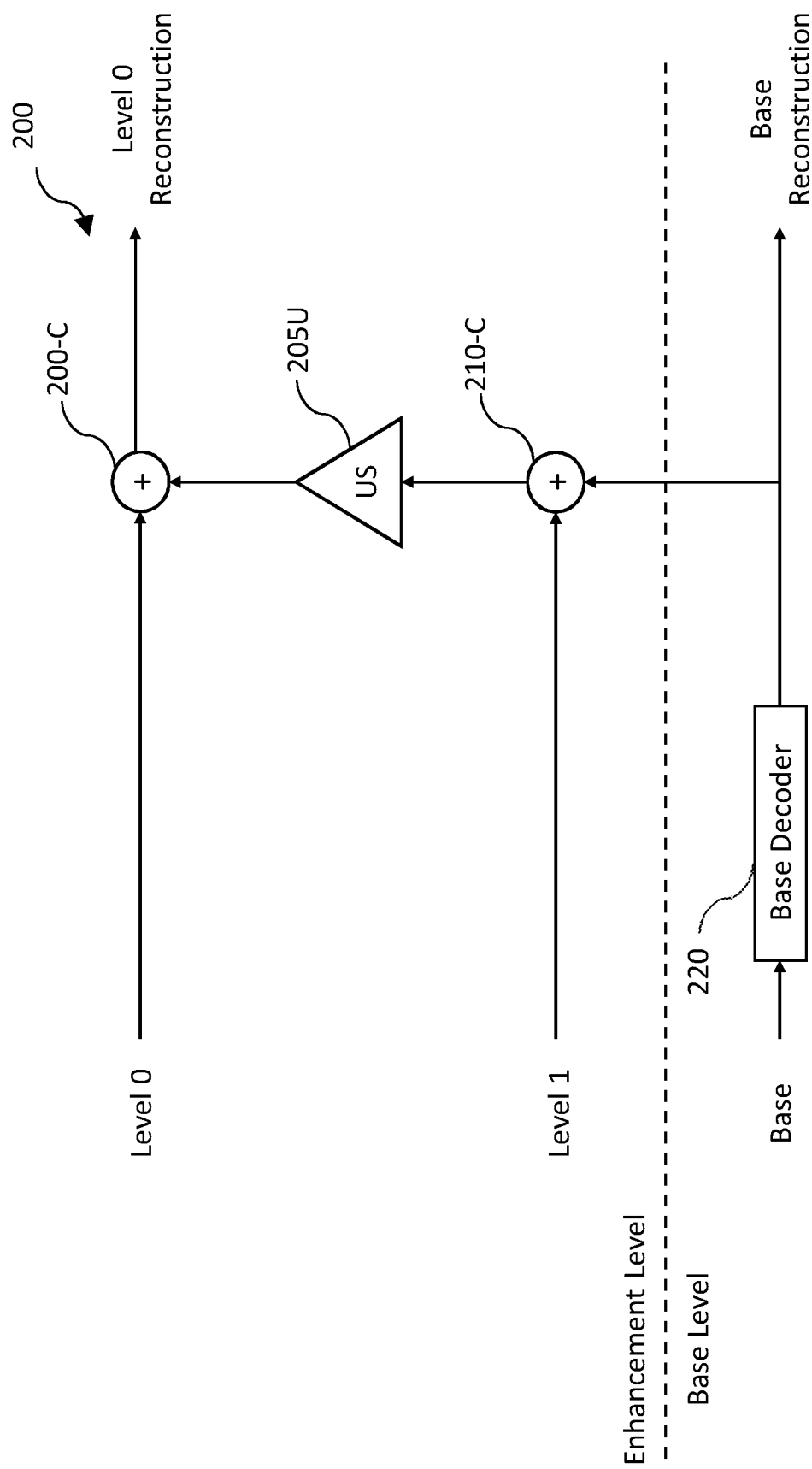
FIG. 12 is the block diagram of the decoder of FIG. 4 modified to show quantisation, transforming and entropy encoding steps removed.

FIG. 12 is the block diagram of the decoder of FIG. 4 modified to show quantisation, transforming and entropy encoding steps removed.

As can be seen in FIGS. 3, and 10, the base codec 120 can be separated into 2 components, that is a base encoder 120E and a base decoder 120D. It should be noted that the encoding and decoding parts can be in a single codec module, either in hardware or in software, or they can be separate modules or components. The base decoder 120D may reside at the enhancement level in the encoder 100 if required. This applies also to the base decoder 220 in FIGS. 4 and 12.

In the examples described herein, residuals may be considered to be errors or differences at a particular level of quality or resolution. In described examples, there are two levels of quality or resolutions and thus two sets of residuals (level 1 and level 0). Each set of residuals described herein models a different form of error or difference. The level 1 residuals, for example, typically correct for the characteristics of the base encoder, e.g. correct artifacts that are introduced by the base encoder as part of the encoding process. In contrast, the level 0 residuals, for example, typically correct complex effects introduced by the shifting in the levels of quality and differences introduced by the level 1 correction (e.g. artifacts generated over a wider spatial scale, such as areas of 4 or 16 pixels, by the level 1 encoding pipeline). This means it is not obvious that operations performed on one set of residuals will necessarily provide the same effect for another set of residuals, e.g. each set of residuals may have different statistical patterns and sets of correlations.

In certain described examples, the upsampling type used at an encoder to produce the second residual signal may be signalled to a decoder. For example, a parameter for a global configuration for the signal may indicate an upsample_type (e.g. using an alpha-numeric or integer reference). In this example, the decoder may be configured to use the signalled upsampling type to produce the larger resolution signal, e.g. to determine the upsampling to be applied. This enables upsampling to be flexibly applied, e.g. to the same signal at different times or to different signals.

The invention claimed is:

1. A method of decoding an input signal, the method comprising:
receiving a frame of a base decoded signal, the frame of the base decoded signal being generated by feeding a base decoder with a base encoded version of a signal to be reconstructed;
producing a corrected frame of the signal by adding a first residual signal to the frame of the base decoded signal, wherein the first residual signal is created, in part, via an entropy decoding process comprising one or a combination of an inverse run-length encoding (RLE) operation and an inverse Huffman encoding operation; and
producing a larger resolution frame of the signal by:
up-sampling the corrected frame; and
adding a second residual signal to the up-sampled corrected frame;
wherein the up-sampling is one of bilinear or bicubic up-sampling.

2. The method of claim 1, wherein the up-sampling comprises constructing a plurality of source grids, and wherein the source grids are either 2×2 source grids or 4×4 source grids, the source grids being used to derive destination values of the up-sampled corrected decoded signal.

3. The method of claim 2, wherein each 2×2 source grid has a base location at local index [1, 1] providing a base value, where the local index [1, 1] is the lower right corner of 2×2 source grid, and the remaining sub locations are up, left and diagonally up and left from the base location, each providing a sub value.

4. The method of claim 2, wherein each 4×4 source grid has a base location at local index [2, 2] providing a base value, and sub locations in the remaining part of the 4×4 source grid providing sub values.

5. The method of claim 3, wherein in constructing the 2×2 source grid or the 4×4 source grid, each sub value of the grid which falls outside a boundary of the corrected decoded version is calculated to be the nearest base or sub value at the respective boundary.

6. The method of claim 1, wherein a destination base location in the up-sampled corrected version is calculated from a base location in a respective source grid, and wherein one or more destination sub locations are calculated from the destination base location, to define a destination grid.

7. The method of claim 6, wherein the destination grid is a 2×2 grid, and the destination base location is at local index [0, 0] of the 2×2 grid, where the local index [0, 0] is the top left corner of the 2×2 grid.

8. The method of claim 2, wherein the source grid is a 2×2 source grid, and wherein the up-sampling comprises performing a bilinear interpolation on the data values of the 2×2 source grid using relative weights for each grid position to derive destination data values.

9. The method of claim 8, wherein a destination base location in the up-sampled corrected version is calculated from a base location in a respective source grid, and wherein one or more destination sub locations are calculated from the destination base location, to define a destination grid, wherein the relative weights are dependent on the position of the destination data value being derived within the destination grid.

10. The method of claim 2, wherein the source grid is a 4×4 source grid, and wherein the up-sampling comprises performing a bicubic interpolation on the 4×4 source grid using different coefficients for each destination value being derived.

11. The method of claim 2, wherein the up-sampling comprises applying an up-sampling kernel that is the same size as the source grid.

12. The method of claim 11, wherein a plurality of up-sampling kernels are defined, and the method comprises selecting one of the plurality of up-sampling kernels based on the relative position of a destination pixel with respect to a source pixel.

13. The method of claim 1, wherein the input signal comprises one or more frames of a video signal, each frame comprising a plurality of pixel values.

14. The method of claim 1, wherein the upsampling type used at an encoder to produce the second residual signal is signalled to a decoder, the decoder being configured to use the signalled upsampling type to produce the larger resolution signal.

15. A non-transitory computer-readable storage medium comprising instructions which when executed by a processor cause the processor to:
receive a frame of a base decoded signal, the frame of the base decoded signal being generated by feeding a base decoder with a base encoded version of a signal to be reconstructed;
produce a corrected frame of the signal by adding a first residual signal to the frame of the base decoded signal, wherein the first residual signal is created, in part, via an entropy decoding process comprising one or a combination of an inverse run-length encoding (RLE) operation and an inverse Huffman encoding operation; and
produce a larger resolution frame of the signal by:
up-sampling the corrected frame; and
adding a second residual signal to the up-sampled corrected frame;
wherein the up-sampling is one of bilinear or bicubic up-sampling.

16. A decoder comprising a processor and memory, the processor configured to:
receive a frame of a base decoded signal, the frame of the base decoded signal being generated by feeding a base decoder with a base encoded version of a signal to be reconstructed;
produce a corrected frame of the signal by adding a first residual signal to the frame of the base decoded signal, wherein the first residual signal is created, in part, via an entropy decoding process comprising one or a combination of an inverse run-length encoding (RLE) operation and an inverse Huffman encoding operation; and
produce a larger resolution frame of the signal by:
up-sampling the corrected frame; and adding a second residual signal to the up-sampled corrected frame;

wherein the up-sampling is one of bilinear or bicubic up-sampling.

17. The method of claim 1, wherein the method of encoding used by the base encoder differs from the method of encoding used to produce the first and second residual signals.

18. The method of claim 1, wherein:

producing a residual signal comprises:
- transforming the first residual signal to produce a first transformed residual signal;
- quantizing the transformed first residual signal to produce a first quantized residual signal; and producing a second residual signal comprises:
- de-quantizing the first quantized residual signal to produce a first de-quantized transformed residual signal;
- inverse transforming the de-quantized first transformed signal to produce a reconstructed version of the first residual signal and using the reconstructed version of the first residual signal to correct the first decoded signal;
- transforming the second residual signal to produce a second transformed residual signal; and
- quantizing the transformed second residual signal to produce a second quantized residual signal.

* * * * *